United States Patent
Bannasch

(10) Patent No.: US 6,736,600 B1
(45) Date of Patent: May 18, 2004

(54) ROTOR WITH A SPLIT ROTOR BLADE

(76) Inventor: Rudolf Bannasch, Orankestrasse 55, 13053 Berlin (DE)

(*) Notice: Subject to any disclaimer, the term of this patent is extended or adjusted under 35 U.S.C. 154(b) by 0 days.

(21) Appl. No.: 10/030,564

(22) PCT Filed: Jul. 6, 2000

(86) PCT No.: PCT/EP00/06412
§ 371 (c)(1),
(2), (4) Date: Apr. 12, 2002

(87) PCT Pub. No.: WO01/02742
PCT Pub. Date: Jan. 11, 2001

(30) Foreign Application Priority Data

Jul. 6, 1999 (DE) .......................... 199 31 035

(51) Int. Cl.⁷ .................... B63H 1/26; B64C 11/00
(52) U.S. Cl. .................... 416/129; 416/227 A
(58) Field of Search .................... 416/19, 128, 129, 416/175, 176, 177, 227 R, 227 A, 203

(56) References Cited

U.S. PATENT DOCUMENTS

| | | | |
|---|---|---|---|
| 547,210 A | * | 10/1895 | Haussmann ............. 416/227 R |
| 1,234,070 A | | 7/1917 | Nitschke |
| 1,418,991 A | | 6/1922 | Thompson et al. |
| 1,591,405 A | | 7/1926 | Shaw |
| 1,703,412 A | | 2/1929 | Thompson |
| 3,087,553 A | * | 4/1963 | Kostyun ................. 416/129 X |
| 3,504,990 A | | 4/1970 | Sugden |
| 4,445,817 A | | 5/1984 | Wethern |
| 5,269,647 A | | 12/1993 | Moser |
| 5,269,656 A | | 12/1993 | Maga |
| 5,890,875 A | | 4/1999 | Silvano |

FOREIGN PATENT DOCUMENTS

| | | |
|---|---|---|
| DE | 53013 | 8/1890 |
| DE | 63661 | 7/1892 |
| DE | 83050 | 8/1894 |
| DE | 132953 | 8/1902 |
| DE | 912660 | 10/1953 |
| DE | 61438 | 9/1967 |
| DE | 4226637 | 2/1994 |
| DE | 19752369 | 5/1999 |
| EP | 266802 | 5/1988 |
| FR | 808.801 | 2/1937 |
| FR | 819.229 | 10/1937 |
| FR | 1.062.473 | 4/1954 |
| FR | 2521097 | 8/1983 |
| GB | 21592 | 5/1924 |

* cited by examiner

Primary Examiner—Edward K. Look
Assistant Examiner—Richard A. Edgar
(74) Attorney, Agent, or Firm—Marshall, Gerstein & Borun LLP

(57) ABSTRACT

A rotor through which a fluid flows in a main direction of flow, provided with at least one rotor blade, the rotor blade being arranged to rotate about a rotor axis. The rotor blade extends away from the axis of rotation into the field. To reduce the trailed tip vortex at the end of the rotor blades, the fluidic losses, and flow noise, the rotor blade is split in at least two partial blades at a set distance from the axis of rotation and forms a loop. One partial blade extends in the direction of rotation in relation to the rotor blade. The other partial blade extends in a direction opposite the direction of rotation to the rotor blade. The two partial blades are interconnected in one piece at their ends, to encompass a loop surface extending essentially crosswise to the main direction of flow, through which the fluid flows.

10 Claims, 7 Drawing Sheets

DETAIL II

ROTOR WITH A SPLIT ROTOR BLADE

FIELD OF THE INVENTION

The invention relates to a rotor, which in operation is flown through by a fluid in a main flow direction, the rotor having a rotor blade arranged rotatable around a rotor axis and extending at least partially away from the rotor axis into the fluid, the rotor blade being split into at least two partial blades at a predetermined distance from the rotor axis, one partial blade being curved in a turning direction away from the rotor blade and the other partial blade being curved against the turning direction away from the rotor blade, the two partial blades being connected to form a loop.

BACKGROUND OF THE INVENTION

From the prior art, rotors for the generation of thrust or propulsion or for the generation of an angular momentum are known and comprise in the first case propellers and marine propellers, blowers, fans, and ventilators etc., and, in the second case, flow-driven repellers, turbines and windmills. In the case of marine or aeronautic propellers, a rotor blade mounted on a hub is turning around an axis of revolution and generates a propulsion force due to its profile shape or due to its incidence while rotating around the axis of revolution. Averaged over one revolution, the propulsion force extends essentially parallel to the axis of revolution and propels the ship or the plane. In the case of helicopter rotors, a shifting of the rotor blades during the rotation around the axis of revolution may generate a propulsion force, which is inclined relative to the axis of revolution. In this context, the main flow direction is understood as the direction, under which the flow passes the rotor if the rotor is reduced to a plane in a far-field view.

The efficiency of rotors is lessened by flow losses in the form of vortex generation, swirl, and—if the rotor is operated in liquid media—by cavitation. Often, sound emission is a problem. The noise generated by marine or aeronautic propellers, by helicopter rotors, wind mills, various fans and blowers, for example in air conditioning systems, contributes significantly to today's acoustic environmental load.

From the prior art, rotors of the general type are known that, in comparison to previously known rotors, lead to an improved efficiency and to a reduction of the sound emission or of the sound generation.

For example, a rotor is known from DE 42 26 637 A1 having a rotor blade, which is split into two partial blades. This rotor may reduce the vibrations during operation.

Another rotor is known from DE-PS 83050. This rotor leads to an increase in the reaction pressure.

In U.S. Pat. No. 1,418,991 a rotor is described having a rotor blade that is split into two partial blades at a distance from the axis of revolution, the partial blades extending in and against the direction of rotation of the rotor with respect to the rotor blade. The rotor of U.S. Pat. No. 1,418,991 may reduce the flow resistance.

Rotors of this general type are also known from U.S. Pat. No. 3,504,990 and from U.S. Pat. No. 4,445,817.

The rotor shown in U.S. Pat. No. 3,504,990 has support arms that do not affect the flow. At the ends of the support arms there is mounted an annular surface, which generates the propulsion of the rotor over its circumference or perimeter.

From U.S. Pat. No. 4,445,817, there is known a rotor having rotor blades that are made from a planar rotor stand extending perpendicular to the main flow direction and from a strip-shaped rotor blade. Each strip-shaped rotor blade is bent and fastened tot the rotor blade coming next in the turning direction. This rotor, too, generates propulsion exclusively at the outer perimeter of the rotor blade.

Further, in DE 197 52 369 a propulsive body is shown that has an end lying transverse to the flow direction and being split while forming a loop.

In EP 0 266 802 a curved-surface propeller is shown, of which the conveying blades form sections of an envelope of a cone. The curved surface and the conveying blades each surround holes through which the conveyed mass flows.

The disadvantages of the rotors known from the prior art is that the improvements they achieve in the efficiency and in the noise emission are no longer sufficient for today's applications.

SUMMARY OF THE INVENTION

Therefore, it is the objective of the present invention to improve the initially mentioned rotors by simple design measures so that their efficiency is increased.

In particular, it is intended that, besides having an improved efficiency, the rotor generates less noise and is thus particularly beneficial to the environment.

This object is solved by a rotor of the initially mentioned type on one side in that a propulsion force or an angular momentum around the rotor axis is generated in operation by the rotor blade, and in that the rotor axis passes through the loop area enclosed by the loop.

On the other side this object is solved for a rotor of the initially mentioned type in that a propulsion force or an angular momentum around the rotor axis is generated in operation by the rotor blade, and in that the leading edge of the one, front, partial blade is situated in the main flow direction upstream of the leading edge of the other, rear, partial blade at least in an area close to the rotor blade.

This solution is simple and results in a significant noise reduction with the rotors.

By the connecting or combining the partial blades to a loop, the circulations changes continuously along the blade contour from one partial blade to the other. The circulation must be zero at one point along the blade contour, where the sign of the circulation between the two partial blades changes. Thus, the loop forms a means by which the circulation of the rotor over the whole perimeter of the loop and therefore in the trailing vortices generated in the wake is distributed uniformly. Thereby, a more even distribution of the circulation may be reached along the rotor blade and along the loop-forming partial blades than is known in the prior art. The vorticity is distributed spatially over the whole blade perimeter or circumference of the loop, which leads to decreased losses due to vortex generation and to a decreased generation of flow noise.

The loop-shaped ring closure of the partial blades also results in a high mechanical stability of the rotor. This may reduce the structural weight and may lead to an altogether more filigree design. Further, the depth or chord of the profile may be reduced at those parts of the loop formed by the partial blades, which parts only make a small contribution to the thrust. This may reduce the frictional resistance.

If, in the case of a single-bladed propeller, the axis of revolution passes through the plane of the loop, imbalances during the rotation of the propeller may be avoided by this simple design measure.

For simple applications, such as simple fans or ventilators or toy planes or toy wind wheels, the rotor blade and the partial blades may be formed for example as inclined flat planes; for technically more complex applications, such as airplane propellers or ship propellers, the rotor blade and the partial blades may be formed by wing-like profiles with a particular thickness distribution and camber. A profile that, depending on the local flow conditions, changes along the rotor blade and along the partial blades, leads to particularly advantageous flow characteristics and to an improved efficiency. In this context, the change of the blade depth and of the local angle of attacks may be adapted to the local flow conditions.

The generation of thrust or propulsion, or of an angular momentum by the rotor blades themselves is essential to the invention. By this principle, the inventive rotor differs from the rotor of U.S. Pat. No. 4,445,817. Although this rotor may form a loop, the rotor disclosed there does not have rotor blades that extend away from the axis of revolution into the flow and generate thrust. Rather, the loop-shaped ribbon is held by support arms, which must interact with or disturb the fluid flow as little as possible. The rotor of U.S. Pat. No. 4,445,817 generates the propulsion solely by the circumferential ribbon. In operation, the ribbon performs a movement similar to the wave motion of a fish tail or of a bird wing. This way of propelling has a low efficiency. The rotor according to the invention also differs by the above-mentioned principle from other known loop designs, such as the blade apparatus of U.S. Pat. No. 5,890,875. In this design, there are again provided no rotor blades, which leads to the generation of only small propulsion forces or angular momentums, respectively.

In the embodiment according to the invention, one partial blade may be in front of the other partial blade, both with respect to the turning direction and the main flow direction, in at least an area close to the rotor blade. In this case, either the leading edge of the one partial blade may be located upstream with respect to the main flow direction of the leading edge of the other partial blade, or the one partial blade may be located as a whole upstream of the other partial blade. In this arrangement of the partial blades, the flow from the pressure side of the front, upstream partial blade may be directed to the suction side of the rear, downstream rotor blade at least in the region close to the rotor blade. Thus, kinetic energy is added to the flow around the downstream partial blade by the faster flow from the low-pressure or suction side of the upstream partial blade. This leads to a more stable flow around the rear partial blade.

In a preferred embodiment of the rotor, the partial blades may be gradually bent away from the rotor blade in an essentially transition-free or jump-free manner. Such a continuous shape transition of the partial blades may avoid corner flows that may otherwise be present at kinks or folds during strongly varying operational conditions of the rotor, and may lead to losses.

In a further very advantageous embodiment, both partial blades may be integrally connected at their ends. Due to the mechanical connection of the partial blades, this design is particularly stable and capable of bearing loads, thus being able to reduce the vibrations generated by the rotor. Furthermore, the danger of injuries, which is caused by the tips of the partial blades, is minimized.

In a further advantageous embodiment of the invention, both partial blades may preferably smoothly transition or merge into each other. This means that both partial blades have, at their point of connection, essentially the same profile shapes and that their contours are connected in an essentially smooth manner with each other. This may for example be accomplished by an integral formation of the two connected partial blades.

The flow losses may be independently minimized in that in another advantageous embodiment, the trailing edge of the rotor blade continues as the trailing edge of the rear, downstream partial blade, preferably in a smooth and continuous manner. Likewise, the leading edge of the rotor blade may continue as the leading edge of the front, upstream rotor blade. By this, it is avoided that the flow is adversely affected by irregularities in the leading edge. Similarly, the distribution of the circulation may change considerably if only small irregularities are present at the trailing edge of the corresponding rotor blade or partial blade, respectively. In another embodiment, which is particularly advantageous in the case of a rotor according to the invention having only a single rotor blade, the axis of revolution may pass through the loop area.

In a further advantageous embodiment, the rotor may be provided with a plurality of rotor blades that are preferably equidistantly spaced in the turning direction and have the front, upstream partial blade of a rotor blade connected respectively with the rear, downstream partial blade of a rotor blade being located ahead in the circumferential direction. These embodiments make sure that there is low material consumption and a reversion of the circulation along the loop. The larger number of rotor blades makes possible an altogether larger propulsion at a smaller volume. The advantage of this embodiment lies in the combination of high propulsion or a high angular momentum with an advantageous uniform distribution of the circulation in the wake of the rotor. In spite of its high output or power, the rotor remains silent in this embodiment. Preferably, the partial rotors of rotor blades that are adjacent in the circumferential direction are connected to form a loop.

To obtain optimum flow conditions at the rotor blade and at the partial blades in various operational states, at least one of the rotor blades and the partial blades should be adaptable to a change in the local flow conditions, i.e., to flow conditions that are limited to the location of the respective rotor blade and/or partial blade. For this, at least one of the rotor blade and the partial blade may be at least sectionwise provided with an elastic outer skin. Using a proper tuning or adaptation of the materials and a corresponding pretensioning of the outer skin, local changes of the profile geometry of the rotor blade and/or the partial blade are possible either solely because of the fluid mechanical forces acting on the profile, i.e., passively, or by using a contour adaptation means, i.e., actively, without the occurrence of folds or kinks at the outer skin that may negatively influence the flow. Furthermore, an elastic outer skin with a properly selected elasticity may lead to a flow around the rotor blade and/or the partial blade having fewer losses. An elastic outer skin may react to local pressure disturbances by locally rather limited deformations and thus may absorb these local pressure disturbances, which will result in a more silent as well as less noise emitting flow around the rotor blade and/or the partial blade.

Further, the rotor may be equipped with a profile adjustment means in another advantageous embodiment. The profile adjustment means may act on the outer skin and may be shiftable at least sectionwise for a local or even global change of the profile geometry of the rotor blade and/or the partial blade. In this context, a local change is understood as a change in the profile geometry or in the contour of the rotor blade and/or the partial blade, respectively, that takes place only in a rather limited area of the rotor blade and/or the partial blade and leaves the flow essentially unaffected in other areas of the rotor blade and/or the partial blade. A global change of the profile geometry, in contrast, changes a large portion of the profile geometry of the rotor blade and/or the partial blade and leads to a substantial change of the characteristics of the flow around the rotor blade and/or the partial blade.

In a further advantageous embodiment, the rotor may be equipped with a hub, at which the rotor blade is supported. The rotor blade may be supported rotatable or pivotable at the hub by a means for changing the angle of attack. By changing the angle of attack, the propulsion generated by the rotor may be held constant over a wide range of rotational velocities of the rotor or may be adapted to the momentary operational conditions in a very simple manner. In an elastic design of the rotor, it is further possible to obtain a favorable torsion or wash-in of the blade structure along the loop lines. Likewise, a means for adjusting the angle of attack may be provided, by which the partial blade is rotatably supported at the rotor blade for changing the angle of attack. In fluid mechanics, the angle of attack in general stands for the inclination of the profile chord of the rotor blade and/or the partial blade relative to the local on flow of the rotor blade and/or partial blade. The profile chord connects the leading edge, i.e., the connecting line of the upstream stagnation points of the rotor blade and/or partial blade, with the trailing edge, i.e., the connection of the downstream stagnation points of the rotor blade and/or the partial blade.

In a further advantageous embodiment, a yaw or means for changing the sweep angle may be provided by which the rotor blade is held pivotable with respect to the hub in the direct of the propulsion. By such an actuating means, the sweep angle of the rotor blade, i.e., the angle of the leading edge relative to the main flow direction may be changed and the circulation generated by the rotor may be better distributed in the wake. A similar means may also be provided between the rotor blade and the partial blade to change the sweep of the partial blade. To take the swirling component of the on flow of the rotor blade and/or the partial blade into consideration when the sweep angle is being changed, the sweep angle changing means may pivot at least one of the rotor blade or the partial blade about a flow parallel to the axis of revolution.

In a further advantageous embodiment, a means for changing an opening angle may be provided between the rotor blade and the partial blade, with which at least one partial blade is connected in such a manner that an opening angle between two partial blades of a rotor blade may be adapted depending on the operational state of the rotor, said opening angle being directed essentially in the direction of rotation.

A further possibility for adaptively adjusting the rotor geometry, which improves the efficiency at a large number of operational situations, may be reached by an extension means, which is provided between the rotor blade and the partial blade and by which the partial blade is supported extendable with respect to the spanwise direction of the rotor blade. By extending the partial blades and/or the rotor blade, the surface area that generates the propulsion is enlarged so that more propulsion may be generated while keeping the circulation per unit surface area of the rotor blade and/or the partial blade constant.

Finally, two or more rotors according to the invention may be coupled in series. If the rotors rotate in opposite directions relative to each other, the corresponding vorticity strengths are superimposed in the wake of these two rotors and partially cancel each other. Using an appropriate adjustment, even a complete cancellation of the vorticity strength in the direction of the axis of the revolution, the swirl, of at least one of the rotors may be reached. By the elimination of the swirl, the losses may be minimized in the wake of the propellers connected in series. An optimum superposition of the vorticity strengths may be reached if the rotors have approximately the same diameter. The upstream rotor may also be configured as a stator, thereby reducing the design efforts.

BRIEF DESCRIPTION OF THE DRAWINGS

In the following, the design and the function of a rotor with a rotor blade split in partial blades according to the invention is explained with the help of exemplary embodiments.

DETAILED DESCRIPTION OF THE INVENTION

First, the basic structure of a rotor according to the invention is described with reference to the embodiment shown in FIG. 1.

Figure 1:
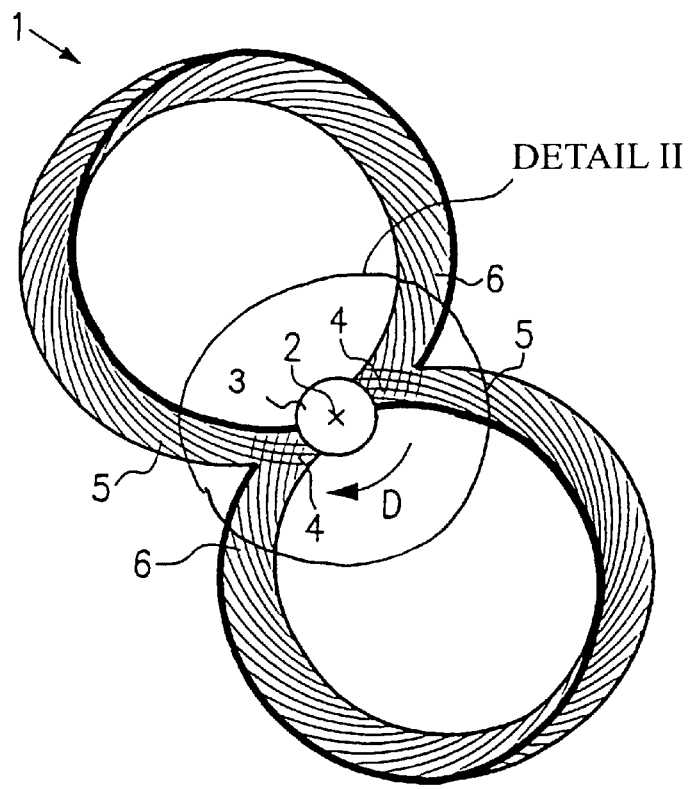
FIG. 1 shows a first embodiment of a rotor according to the invention with two rotor blades, each of which is split.

In FIG. 1, a rotor 1 is shown in a plan view in the direction of an axis of revolution 2, around which the rotor is rotatably supported. In the shown embodiment, the rotor 1 may be used for blowers or fans, propellers, rotors, or as a turbine or wind wheel. Around the axis of revolution, a hub 3 is arranged, at which two rotor blades 4 are mounted. Each rotor blade 4 extends essentially away from the hub or the axis of revolution in the radial direction into a fluid that surrounds the rotor 1.

Each rotor blade 4 is split in two partial blades 5, 6. The partial blades 5, 6 of the two rotor blades that are successive or consecutive in the circumferential direction, are each combined to form a loop.

In operation, the rotor 1 rotates around the axis of revolution 2 in a turning direction D. The rotor 1 may passively rotate with the flow, as it is the case for example in wind mills. In this case, the flow against the rotor 1 is directed essentially along the axis 2. Due to a proper profiling and/or angle of attack of the rotor blade 4 as well as the partial blades 5, 6, an angular momentum is generated around the axis 2 of revolution. The angular momentum may be used for generating energy with the help of a generator (not shown) that is connected to a rotor shaft (not shown) rotating with the rotor. Conversely, the rotor 1 may be actively driven by a driving motor (not shown). Because of the proper profiling and/or inclination of the rotor blades 4 and/or the partial blades 5, 6, the turning of the rotor generates a flow and thus propulsion, the flow being directed through the area over which the rotor blade 4 and the partial blades 5, 6 move, and through the loop.

Figure 2A:
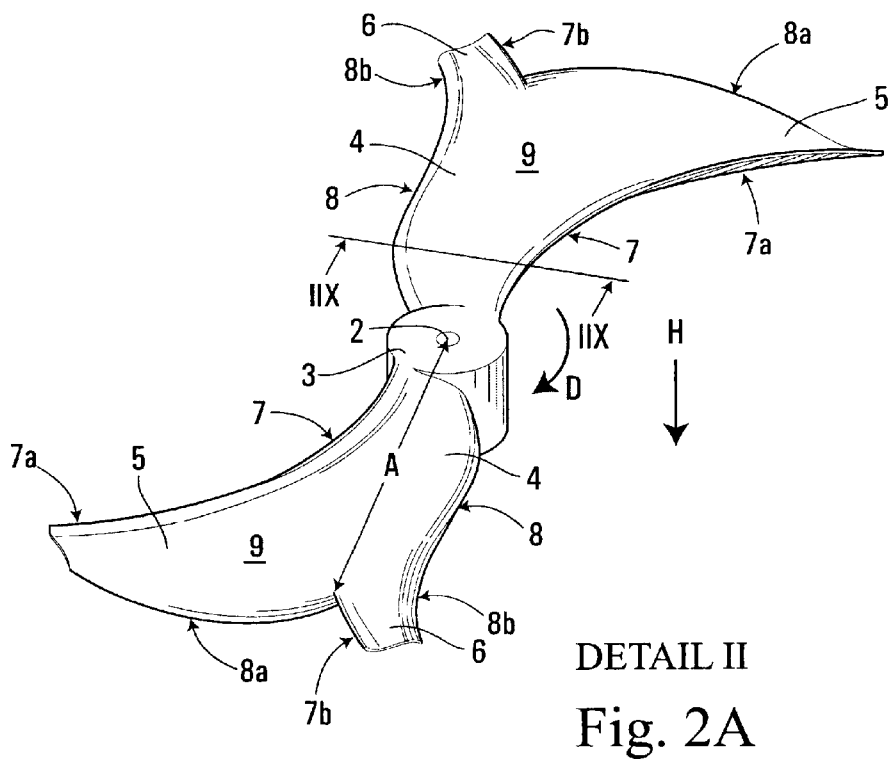
FIG. 2A shows a detail II of a first modification of the rotor of FIG. 1.
Figure 2B:
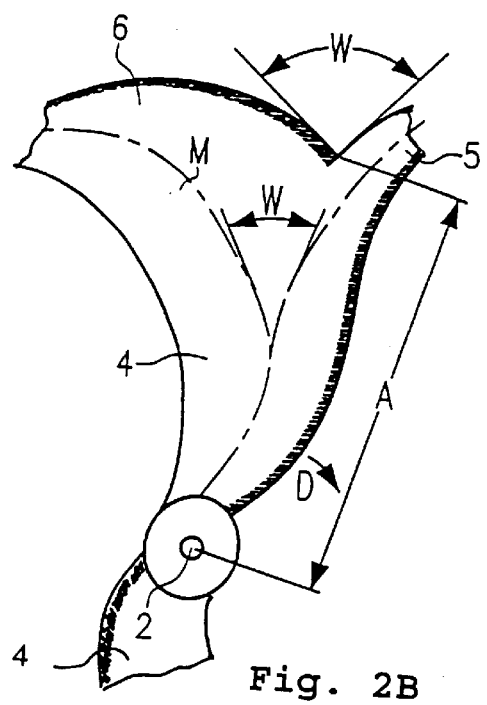
FIG. 2B shows a detail II of a second modification of the rotor of FIG. 1.

In FIGS. 2A and 2B, a Detail II of FIG. 1 is shown to explain the geometry of the rotor blade and of the partial blades. The loop formed by the rotor blades is not shown in FIGS. 2A and 2B for simplicity's sake.

The rotor blade 4 is split at a distance A into a front partial blade 5—located upstream in the main flow direction—and a rear partial blade 6—located downstream in the main flow direction. The rotor blade 4 merges smoothly with the respective partial blades 5, 6 without any jumps in the cross-section.

The leading edge 7 of the rotor blade 4 facing in the main flow direction continues seamlessly as the leading edge 7a of the front partial blade 5. The trailing edge 8 of the rotor blade 4 continues seamlessly as the trailing edge 8b of the rear partial blade 6. The front partial blade 5 develops its own trailing edge 8a after the rotor blade 4 is split into the two partial blades 5, 6. The trailing edge 8a overlaps at least partially a leading edge 7b in a region near the rotor blade 4, the leading edge 7a being developed by the rear partial blade 6. However, this overlap may also not be present.

The front partial blade 5 is bent away with respect to the rear partial blade 6 in the turning direction D, so that the front partial blade 5 spreads from the rear partial blade 6.

In the view of FIG. 2A, where the viewing direction is in the main flow direction along the axis of revolution 2, the surface 9 of the rotor blade 4 and of the two partial blades 5, 6 forms the pressure side, at a propeller, rotor etc. the suction side. The suction side and the pressure side differ from each other by the pressure conditions, which prevail thereon. The mean or averaged fluid pressure on the suction side is lower than the mean or averaged fluid pressure on the pressure side. This pressure difference generates the propulsion of the rotor, the propulsion pointing in the direction of the axis of revolution 2, or, in the case of a windmill. the angular momentum. The suction side and the pressure side are separated from each other by the leading edges 7, 7a, 7b and by the trailing edges 8, 8a, 8b.

In this context, the leading edge is the connecting line of the stagnation points of the rotor blade or of the partial blades, respectively, that faces in the direction of the on flow, i.e., of those points, at which the mean or averaged velocity relative to the respective rotor structure is zero. The trailing edge results correspondingly from the connecting line of the rear stagnation points.

In the exemplary embodiment of FIG. 2A, the front partial blade 5 is configured larger than the rear partial blade 6, and the rotor blade is divided in the profile depth or chord.

Figure 3:
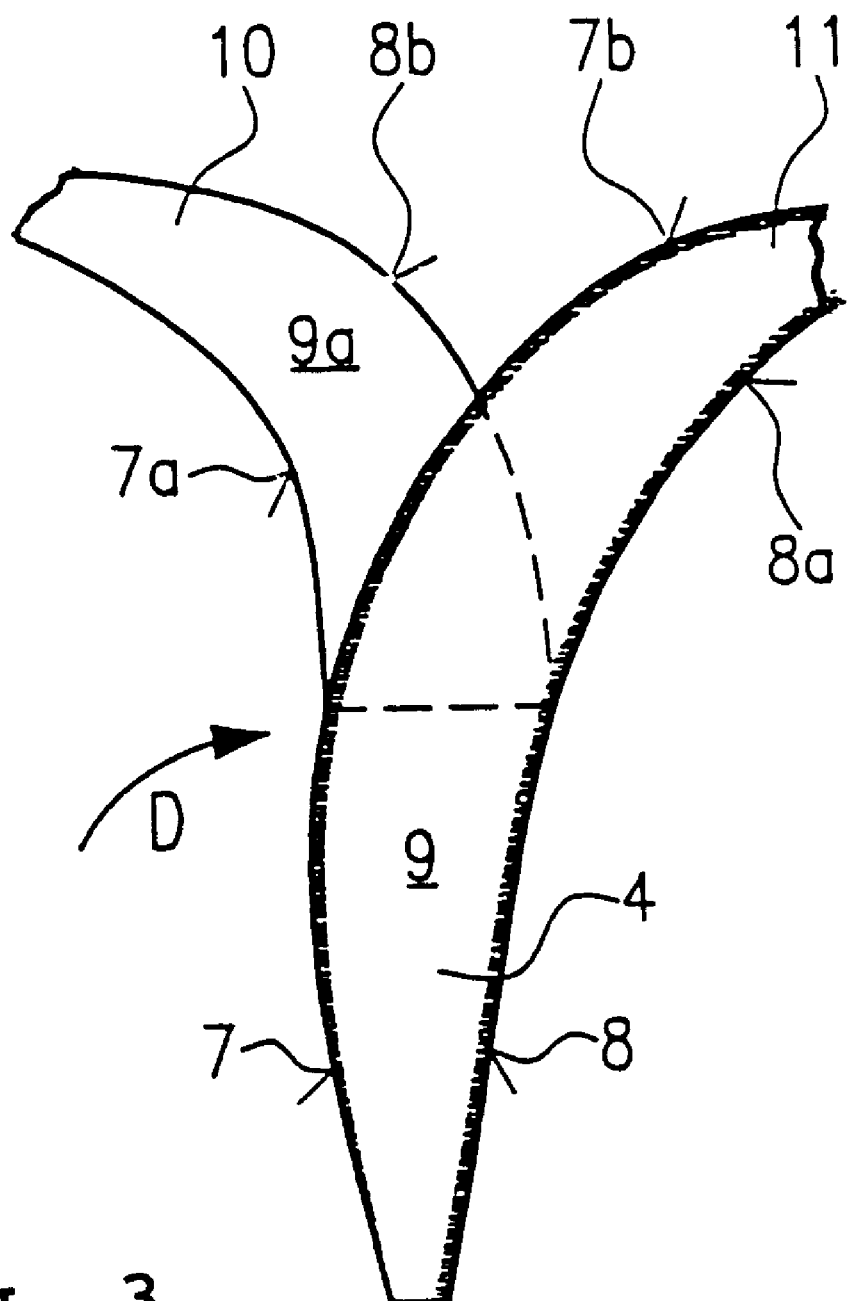
FIG. 3 shows a detail II of a second embodiment of a rotor according to the invention.

Alternatively, the rotor blade 4 may not be split in the direction of the chord but in the thickness direction, for example along the mean or center line into a suction-side partial blade 11 and a pressure-side partial blade 10. A rotor according to the invention, having a rotor blade split in thickness direction, is shown in FIG. 3, also as Detail II. The mean or center line of a profile is the line formed by the centers of those circles that touch the upper and the lower side of the profile if inscribed into the profile.

There are possible various forms of transition of the rotor blade according to the invention, where the partial blades may randomly overlap and where the leading edge or the trailing edge of a partial blade may merge with the suction or the pressure side of a rotor blade, respectively.

Due to the curvature of the partial blade 5 in the turning direction of the rotor 1, the fast-flowing fluid on the suction side of the front partial blade 5 is directed to the rear partial blade 6. This leads to an accelerated and thus more stable flow around the rear partial blade.

The suction-side partial blade 11 thereby develops its own suction side (no reference numeral). Similarly, the pressure-side partial blade 10 develops its own suction side 9a. The suction-side partial blade 11 extends relative to the main rotor 4 in turning direction D, the pressure-side partial blade 10 extends opposite to the turning direction with respect to the rotor blade 4. The suction side of the partial blade 11 merges with the suction side of the rotor blade 4, the pressure side of the partial blade 10 merges with the pressure side of the rotor blade. In the embodiment of FIG. 1, the two partial blades 10, 11 have approximately the same size. However, similar to the modification shown in FIG. 2A, a configuration of the partial blades 10, 11 having different sizes is possible. The leading edges of the two partial blades 10, 11 merge smoothly with the leading edge of the rotor blade 4, the trailing edges of the two partial blades 10, 11 merge smoothly with the trailing edge of the rotor blade 4.

FIG. 2B shows another modification of the rotor blade of FIG. 1 in a detailed view II.

The rotor blades of FIG. 2A and FIG. 2B differ by the respective curvature of the rotor blade in or against the turning direction, by the distance A, at which the rotor blade 4 is split, by the size of the partial blades 5, 6 relative to each other, and by the size of the partial blades 5, 6 relative to the rotor blade 4.

In FIG. 2B the opening angle W is shown, which represents the angle by which the two partial blades 5, 6 open or stand ajar.

The opening angle W may be measured in the space between the trailing edge of the one (front) partial blade and the leading edge of the other (rear) partial blade or between the center lines of the two partial blades. The centerline connects those points that, in a radial section, cut the chords in half.

In the rotor of FIG. 2B, the rear partial blade 6 is configured larger than the front partial blade 5. By this, in the case of a propeller, more propulsion, or, in the case of a repeller, a large angular momentum is generated by the rear partial blade 6 than by the front partial blade 5, which leads to a correspondingly higher concentration of vorticity in the wake of the rear partial blade 6. By extending the blade tip to a loop, a favorable vorticity distribution may be generated in the wake, for example by having the partial blade with the larger profile depth occupy a larger portion of the circumference of the loop than the partial blade with the smaller profile depth.

Figure 4:
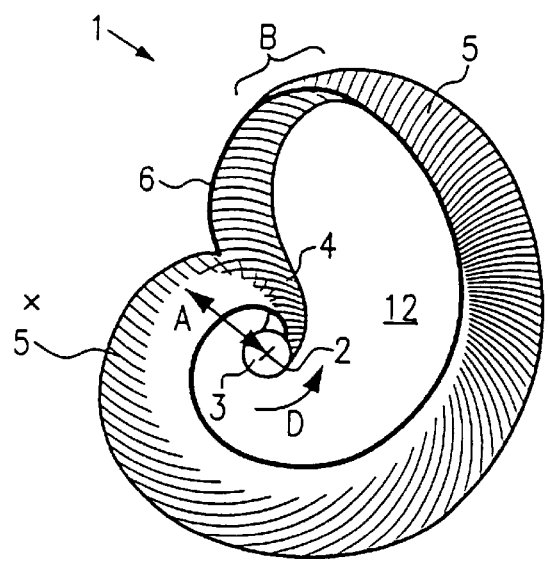
FIG. 4 shows a third embodiment of a rotor according to the invention.
Figure 5:
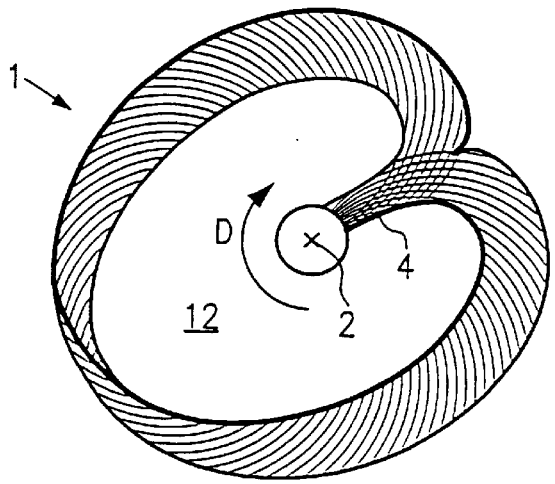
FIG. 5 shows a fourth embodiment of the rotor according to the invention.

FIGS. 4 and 5 show further exemplary embodiments of a rotor according to the invention, which is configured as a "loop-propeller" having only one rotor blade 4. In the rotor of FIG. 4, the front partial blade 5 is connected with the rear partial blade 6 in loop fashion, thus forming a loop area 12.

This loop area rotates in the turning direction D and is traversed by the fluid. The two partial blades 5, 6 are curved in such a manner that the axis of revolution 2 is located within the loop area 12. Thus, the connection of the partial blades 5, 6 is typically located on the side opposite to the rotor blade 4 with respect to the axis of revolution 2. In the embodiment of FIG. 4, the front partial blade 5, however, is comparatively long and curved in a spiral manner, whereas the rear partial blade 6 is shorter and extends essentially in the radial direction away from the axis of revolution 2. The front partial blade 5 and the rear partial blade 6 are connected to each other in a region B, which, in this specific embodiment, is located approximately in the direction of the extension of the main blade. In the region B, the circulation changes its sign.

The partial blades 5, 6 merge seamlessly with each other, so that disturbances that are as small as possible are generated in the flow around the loop propeller. In the embodiment of FIG. 4, the main rotor is curved strongly in the turning direction D and is split into the two partial blades 5, 6 at a relatively small distance A away from the axis of revolution.

In the embodiment of FIG. 4, the partial blades 5, 6 have different lengths, but approximately the same profile depth or chord length. However, partial blades of the same size may also be used in this case, and the profile depth of the partial blades may vary.

Along the transition from the partial blade 5 to the partial blade 6, along the edge of the blade, the sense of rotation of the circulation must change. If one chooses arbitrarily a positive sign for one particular sense of rotation of the circulation and designates the amount of circulation in the area, where the rotor blade 4 is split into the two partial blades 5, 6 or 10, 11, respectively, as $\Gamma_o$, then the circulation must change along the loop from $+\Gamma_o/2$ to $-\Gamma_o/2$ in the case of two equally sized partial blades.

This change of circulation takes place in a gradual way along the blade element. Because the strength of the vortices induced in the wake depends on the local change of the strength of the bound vortex, this will result in an altogether continuous vorticity layer in the wake, which envelops the propeller jet and which has approximately the same strength everywhere.

With the loop propeller of FIG. 4, the whole outer contour may be used to obtain the most appropriate distribution of propulsion (for a driven rotor) or energy yield (for a passively operated rotor) along the rotor blades and the partial blades. For example, the load of the outer elements may be varied by blade elements that are further extended in the outward direction, or by a more annular configuration. This, in turn, may be used to lessen the danger of cavitation in the case of ship propellers. Because of the loop-shaped ring closure of the partial blades 5, 6, the loop propeller achieves a high mechanical stability, making it possible to design the loop propeller in a more lightweight fashion. In sections of the loop propeller where the circulation is only small, i.e., particularly in the region where the circulation changes sign, the profile depth may be decreased.

Figure 6:
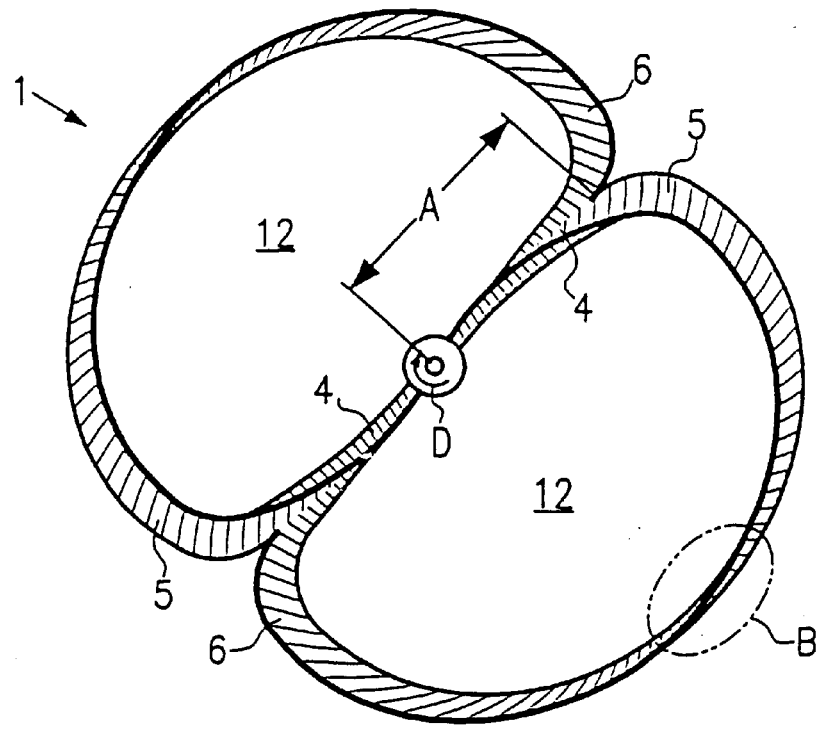
FIG. 6 shows a fifth embodiment of the rotor according to the invention.

FIGS. 5 and 6 show further embodiments of the loop propeller.

Compared to the embodiment of FIG. 4, the single-bladed loop propeller of FIG. 5 has a less strongly curved rotor blade 4. The distance A, at which the rotor blade 4 is split, is larger and the partial blades are approximately of the same length. As a whole, the loop area 12 of the loop propeller of FIG. 5 is configured rounder, which facilitates balancing of the rotor.

The embodiments of FIG. 6 show a further embodiment of a two-bladed loop propeller. In contrast to the loop propeller of FIG. 1, the loop propeller of FIG. 6 is equipped with more elongated loop areas 12, which is accomplished essentially by a larger section A between the splitting of the rotor blade 4 into the two partial blades 6. In FIG. 6, the region B is shown where the front partial blade 5 of the one rotor blade 4 is connected with the rear partial blade 6 of the other rotor blade 4. In the region B, the circulation changes its sign and has a value close to zero. The region B has a small profile depth. Furthermore, the profile may be kept very slender and symmetrical in this region, as the region B contributes only very little to the propulsion or energy generation of the loop propeller 1. Therefore, both the profile or form drag and the friction may be minimized in this region.

Figure 7:
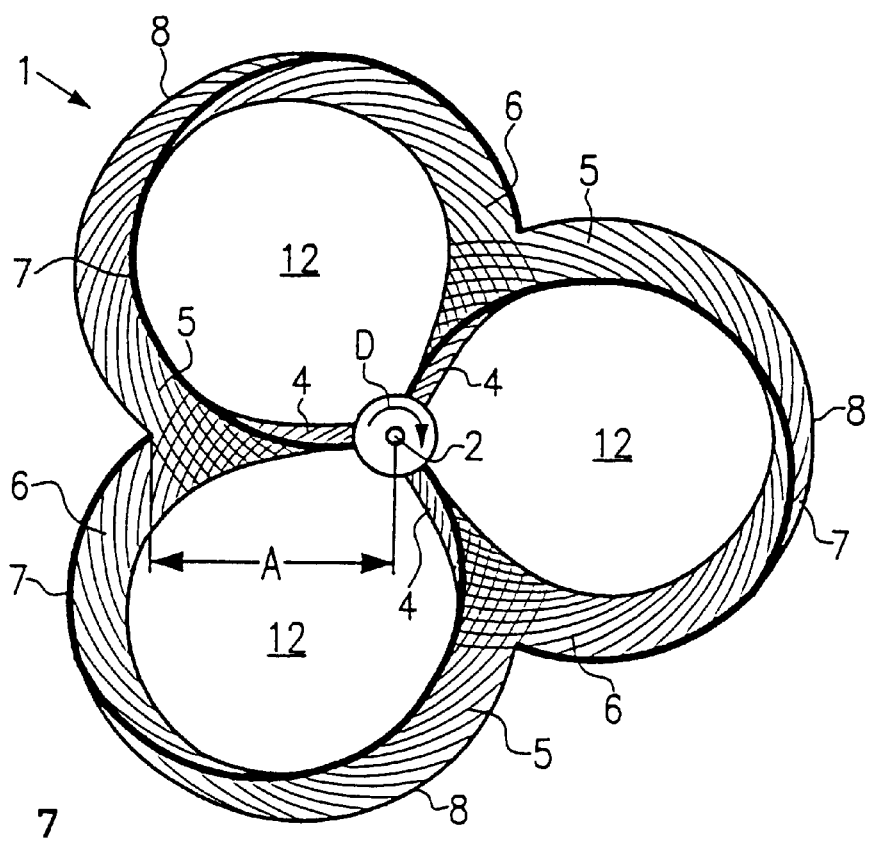
FIG. 7 shows another embodiment of the rotor according to the invention.

The principle of the loop propeller according to FIGS. 1 to 6 may also be transferred to rotors with a plurality of blades. An exemplary embodiment of a multi-bladed loop rotor is shown in FIG. 7. There, three rotor blades 4 that are equidistantly spaced from each other in the turning direction D form a rotor 1. The rotors 4 are each split at the same distance A from the axis of revolution 2 into a front partial blade 5 and a rear partial blade 6. The front partial blade 5 of a rotor blade 4 is connected with the partial blade 6 of the next rotor blade 4 in the turning direction. Depending on the actual application, the direction, in which the partial blades are connected with each other with respect to the turning direction, may also be reversed.

Thus, three loops with loop areas 12 are formed. The loop areas 12 have each a common leading edge 7 that is formed continuously from the upstream edge of a rotor blade, from the front partial blade 5 of the same rotor blade 4 and from the rear partial blade 6 of the other rotor blade 4. Likewise, the respective trailing edge 8 of the loop constituted by the partial blades 5, 6 and by the rotor blade joining the partial blade 6 is formed continuously.

Based on the principal according to the embodiment of FIG. 7, loop rotors with an arbitrary number of rotor blades 4 may be realized. Thus, even more complex geometries are possible where the loops are interleaved, for example by connecting the front partial blade 5 of the one rotor blade for example not with the rear partial blade 6 of a neighboring rotor blade 4, but with the rear partial blade of a more distant rotor blade 4.

As an improvement of this possible modification, a splitting into more than two partial blades is possible, which then may be connected according to the invention to more spatial rotor structures.

According to the invention, means are provided with the rotor 1, that allow an adaptation of the geometry of the rotor blade and the partial blade to various flow conditions.

Such an adaptation may be achieved in that the rotor blade 4 and/or one of the partial blades 5 and 6 is made of an elastic or resilient material or has an elastic or resilient outer skin. This results in the important advantage, that also gradual adjustments of the flow geometries of the rotor blade and the partial blades in particular along the loop structure are possible.

For example, the geometry of a profile of a rotor blade 4 and/or a partial blade 5 may be changed using an elastic outer skin. This is shown schematically in FIGS. 8A to 8C.

Figure 8A:
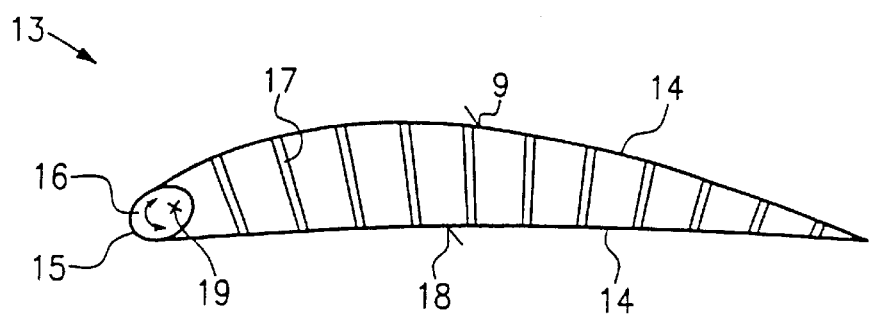
FIGS. 8A–8C show changes in the profile geometry of an adaptive rotor blade according to another embodiment of the invention.

FIG. 8A shows a sectional view along line IIX—IIX of FIG. 2A. The section line IIX—IIX runs perpendicular to a radius extending from the axis of rotation 2. The profile 13 is covered with an elastic and flexible outer skin. The profile 13 of the rotor blade 4 or of one of the partial blades 5, 6 is equipped with a flexible outer skin 14. The flexible outer skin 14 may cover the profile 13 completely or only partially at locations, where the contour of the profile is to be adjusted.

Figure 8B:
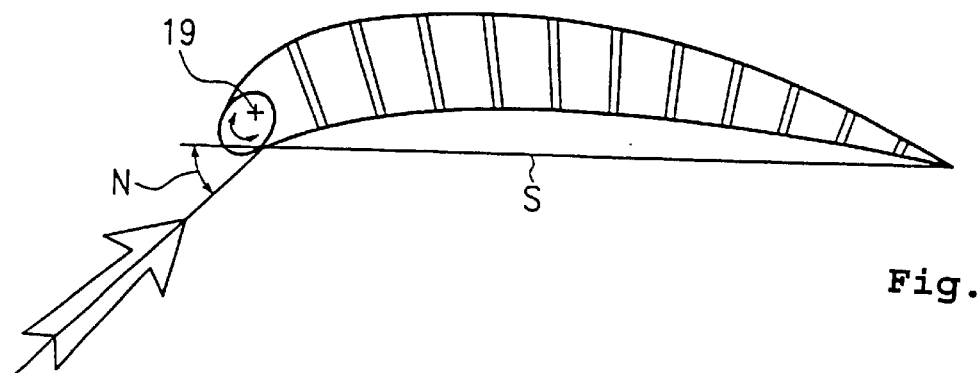
Figure 8C:
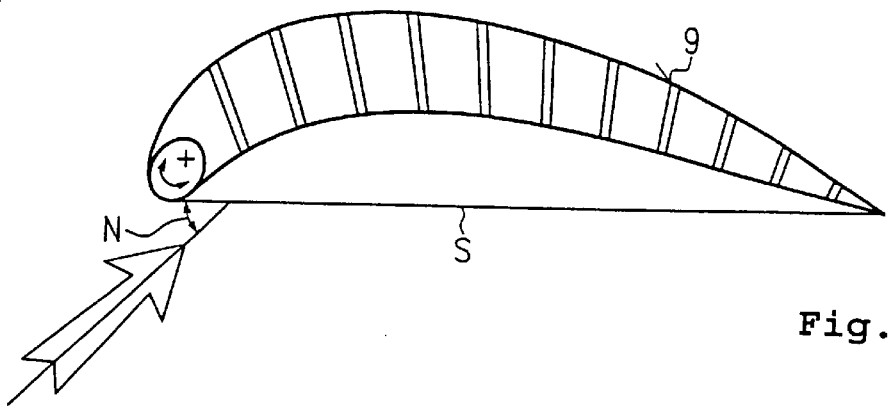

In the interior of the profile 13, a means for adjusting the contour is provided, which is exemplarily shown in FIG. 8A with an eccentrically supported cam 16 forming the nose of the profile and with connecting elements 17 that connect the suction side 9 of the profile 13 with the pressure side 18. The contour adjustment means is capable of changing the shape of the profile depending on the on flow of the profile 13. For example, the angle of inclination of the nose may be changed, as shown in FIGS. 8B and 8C, using the eccentrically supported cam 16 if the cam is turned around an axis of revolution 19. Thus, the angle of attack N between the on flow of the profile 13 as represented by the arrow, and the chord S connecting the leading edge with the trailing edge, has been increased going from FIGS. 8B to 8C. To avoid separation at the leading edge on the suction side 9 at the large angle of attack N of FIG. 8C, the camber of the profile 13 has been increased in FIG. 8C by the contour adjustment means, and the nose has been lowered in the direction of the on flow.

This may be achieved for example by rotating the cam 16 and by shifting the connecting elements 17 relative to each other. The shifting of the connecting elements 17 leads to a segment-wise deformation of the profile, which can be followed by the elastic outer skin without any problems and without affecting the smoothness of the contour. In a similar way, a change of the rear profile region may be generated, for example to create an S-shaped deformation. By the cooperation of a plurality of contour adjustment means, the profile geometry may thus be affected in very complex ways. Other principles of a contour adjustment means are also possible, for example a plurality of eccentric cams distributed along the profile, the cams bending parts of the outer skin to the outside or inside direction, or profiles 13 that are blown up by pressurized air or unfolded by rotational forces.

Even flexible profiles are possible that are at least partially deformed by the forces generated by the flow. With such profiles, the flow may be influenced passively, i.e., without energy input from the outside, only using the energy from the flow itself.

In an improvement of these principles, embodiments are conceivable that combine both active and passive profile adjustments in an advantageous manner.

Figure 9:
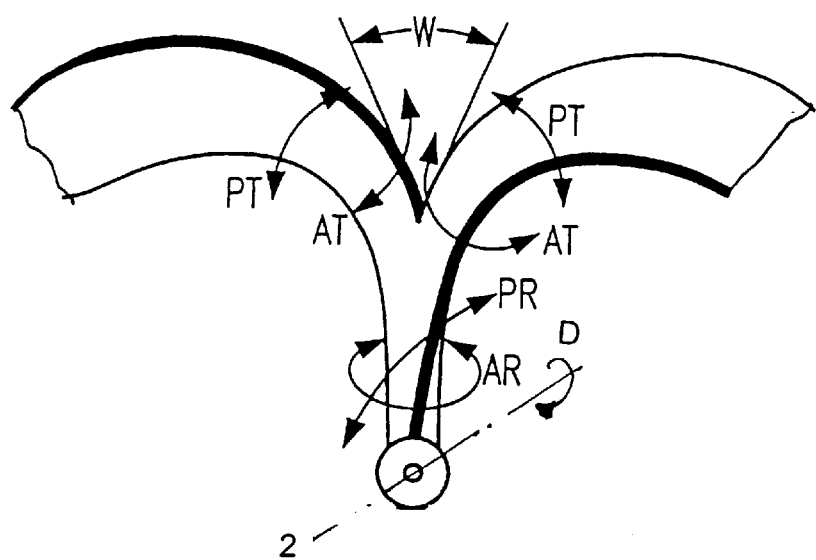
FIG. 9 shows the possibilities for adjustment with an adaptively configured rotor blade according to another embodiment of the invention.

Further ways of the adjustment of a rotor are shown in FIG. 9. By an articulated connection of a rotor blade 4 with a hub 3, the inclination of the upstream stagnation line of the rotor blade 4 may be adjusted relative to the plane of rotation of the rotor 1 along the arrow PR using a sweep angle adjustment means. The sweep angle influences the vorticity concentration in the wake by means of the secondary flow in the radial direction along the leading edge. A similar effect may be achieved for the partial blades 5, 6, if they are also adjustable by a sweep angle adjustment means of their own with an articulated joint along the arrows PT in the direction of the propulsion and/or in the direction of the main flow. Likewise, an angle-of-attack adjustment means (not shown) may be provided, in which the rotor blade 4 is pivotable along the arrows AR around an axis of rotation that extends essentially in the radial direction with respect to the axis of revolution 2. By the adjustment of the angle of attack, the propulsion or, in the case of a passively operated rotor, the angular momentum may be optimized for various rotational speeds and on flow velocities. The partial blades 5, 6 may also be arranged on the rotor blade 4 using an angle-of-attack adjustment means so that the angle of attack of the partial blades 5, 6 may be changed relative to the rotor blade 4 in the direction of the arrows AT.

Figure 10A:
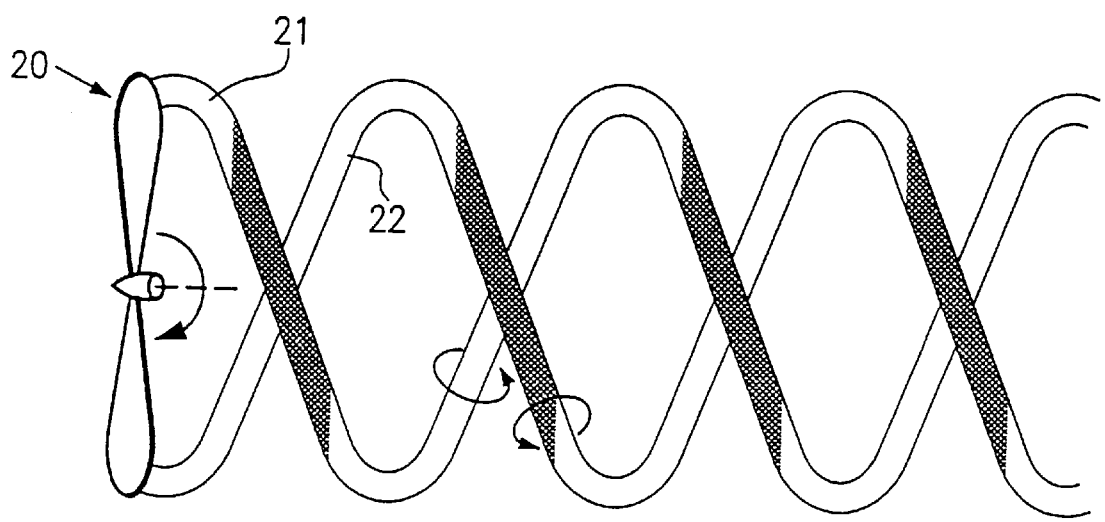
FIGS. 10A and 10B show the vorticity field in the wake of a propeller known from the prior art and of a propeller according to the invention.
Figure 10B:
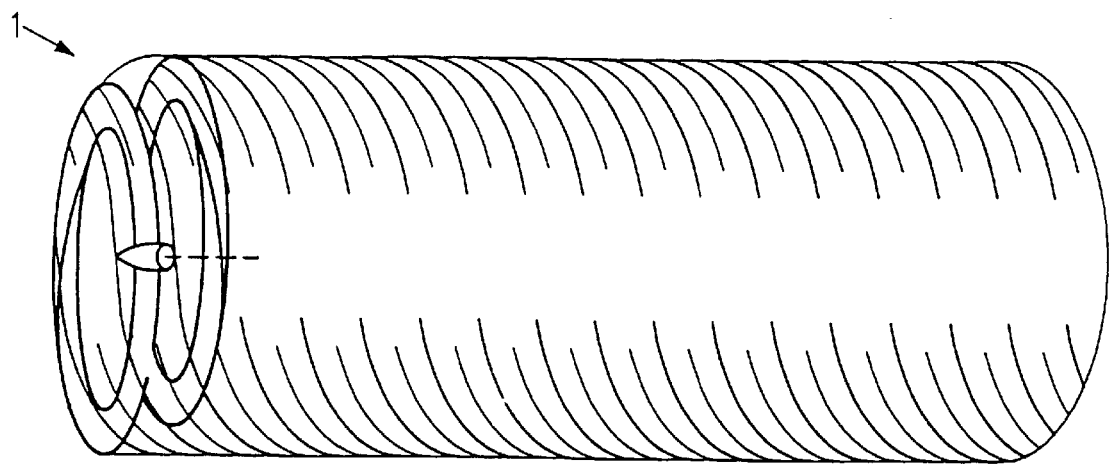

In FIGS. 10A and 10B, the effect of the rotor 4 according to the invention is shown schematically. In FIG. 10A, a known propeller 20 with two blades is shown. Tip vortices are formed on the tip of each rotor blade of the rotor 20, which leads to two trailing vortices 21, 22 that are helically twisted within each other. In such a known rotor, the vorticity is concentrated in the vorticity filaments 21, 22. The high vorticity concentration results in high losses and an increased noise generation. If a vortex filament 21, 22 hits a body, flow noise will be generated.

In contrast, the circulation in the wake of the loop propeller according to the invention having a split rotor blade 4 according to the invention is distributed uniformly in an envelope fashion. This leads to decreased losses and to a decreased flow noise. The uniform envelope-like distribution of the vorticity in the wake of the rotor according to the invention may function in a way similar to a shroud of a shrouded propeller. The even distribution of the vorticity in the wake of the rotor makes it possible to cancel the components of the vorticity in the direction of the axis of revolution by superposition of two wakes with corresponding vorticities. A reduction to practice of this principle is discussed with the following embodiment.

Figure 11:
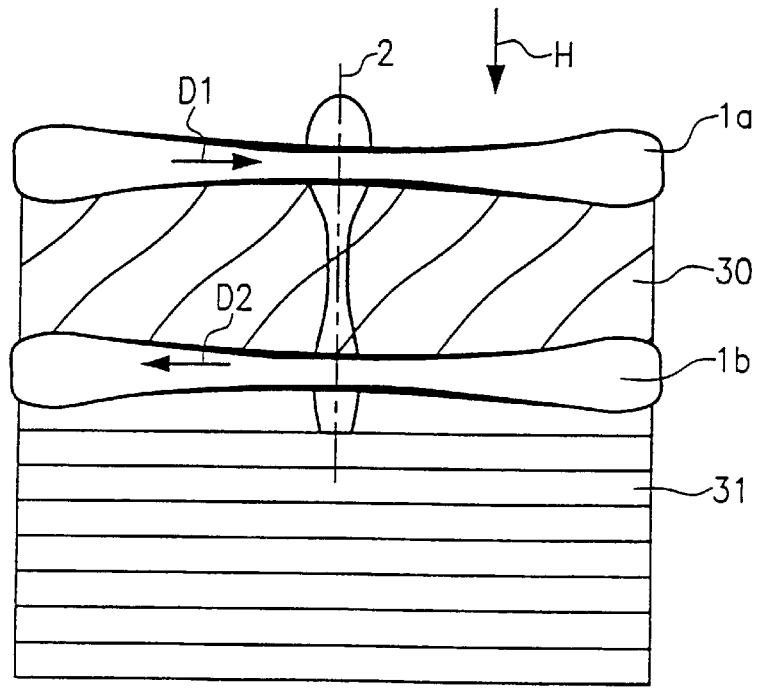
FIG. 11 shows another embodiment of the invention, where two rotors are connected in series.

FIG. 11 shows an arrangement of loop propellers 1 or of rotors 1, respectively, having a split rotor blade 4 according to the invention, which arrangement leads to an additional decrease of the fluid mechanical losses. Two rotors 1a and 1b according to the invention are connected in series, one behind the other. The rotational velocities of the two rotors 1a and 1b are different. A proper adjustment of the relative rotational velocities of the rotors 1a and 1b may lead to an elimination of the swirl from the wake of the upstream rotor 1a, so that the wake of the rotor 1b is swirl-free. The flow swirl contributes to the helical twisting of the vortex filaments in the wake of the rotor as described above as is schematically shown in FIG. 11. Because of the swirl, additional energy is put into the turning of the flow field in the wake that cannot be used for the generation of energy or for the generation of propulsion of the actively or passively operated rotor. Using an appropriate counter-rotation of the downstream rotor 1b, the swirl may be eliminated, converted into thrust, and there is no more a helical twisting of the vortex field in the wake of rotor 1b.

The rotors 1a and 1b are not provided with the same number of blades or with the same blade geometry in order to reduce the flow noise and the vibrations due to interference. Using an appropriate configuration, the upstream rotor 1a may for example generate more swirl than the propulsion and the downstream rotor may generate more propulsion than swirl. In an extreme case, the upstream rotor may be configured as a stator.

Likewise it is possible to arrange a plurality of rotors to a jet engine.

I claim:

1. Rotor apparatus which in operation is flown through by a fluid in a main flow direction (H), comprising a rotor blade (4) arranged rotatable around a rotor axis (2) and extending at least partially away from said rotor axis (2) into said fluid, said rotor blade being split into at least two partial blades (5, 6) at a predetermined distance (A) from said rotor axis, one said partial blade (5, 6) being curved in a turning direction (D) away from the rotor blade (4) and said other partial blade being curved against said turning direction (D) away from said rotor blade (4), said two partial blades (5, 6) being connected to form a loop, said rotor blade (4) generating a propulsion force or an angular momentum around said rotor axis (2), and said rotor axis (2) passes through the loop area (12) enclosed by said loop.

2. Rotor apparatus according to claim 1, wherein the leading edge (7a) of said one, front, partial blade (5, 6) is situated in the main flow direction (H) upstream of the leading edge (7b) of said other, rear, partial blade (6) at least in an area close to said rotor blade (4).

3. Rotor apparatus according to claim 1, and a set consisting of at least two rotors, said rotors being arranged one behind the other along their axes of revolution, said rotors having each an opposite sense of rotation.

4. Rotor apparatus which in operation is flown through by a fluid in a main flow direction (H), comprising at least two rotor blades (4) arranged rotatable around a rotor axis (2) and extending at least partially away from said rotor axis (2) into said fluid, said rotor blade being split into at least two partial blades (5, 6) in a predetermined distance (A) from said rotor axis, one said partial blade (5, 6) being curved in a turning direction (D) away from said rotor blade (4) and said other partial blade being curved against said turning direction (D) away from said rotor blade (4), said one partial blade (5, 6) of one said rotor blade (4) being respectively connected with a partial blade (5, 6) of said other rotor blade (4) to form a loop, said rotor blade (4), in operation able to generate a propulsion force or an angular momentum around said rotor axis (2), and the leading edge (7a) of said one, front, partial blade (5, 6) is situated in the main flow direction (H) upstream of the leading edge (7b) of said other, rear, partial blade (6) at least in an area close to said rotor blade (4).

5. Rotor apparatus according to claim 4, and a set consisting of at least two rotors, said rotors being arranged one behind the other along their axes of revolution, said rotors having each an opposite sense of rotation.

6. Rotor apparatus according to claim 2 or 4, wherein the leading edge (7) of said rotor blade (4) continues as said leading edge (7a) of said front partial blade (5) located upstream.

7. Rotor apparatus according to claim 1 or 4, wherein said two partial blades (5, 6) that are connected to form a loop (12) merge smoothly with each other.

8. Rotor apparatus according to claim 1 or 4, wherein said front partial blade (5) is connected with said rear partial blade (6), respectively.

9. Rotor apparatus according to claim 1 or 4, wherein at least one of said rotor blade (4) and said partial blade (5, 6; 10, 11) is at least partially provided with an elastic outer skin (14).

10. Rotor apparatus according to claim 1 or 4, and a profile adjustment means for at least partially adjusting the contour (13) of at least one of said rotor blade (4) and said partial blade (5, 6; 10, 11).

* * * * *

UNITED STATES PATENT AND TRADEMARK OFFICE
CERTIFICATE OF CORRECTION

PATENT NO. : 6,736,600 B1  Page 1 of 1
DATED : May 18, 2004
INVENTOR(S) : Rudolf Bannasch It is certified that error appears in the above-identified patent and that said Letters Patent is hereby corrected as shown below:

<u>Column 1,</u>
Line 1, replace "claim 4" with -- claim 1 --

Signed and Sealed this

Twenty-fourth Day of August, 2004

JON W. DUDAS
*Director of the United States Patent and Trademark Office*

UNITED STATES PATENT AND TRADEMARK OFFICE
CERTIFICATE OF CORRECTION

PATENT NO. : 6,736,600 B1
DATED : May 18, 2004
INVENTOR(S) : Rudolf Bannasch

It is certified that error appears in the above-identified patent and that said Letters Patent is hereby corrected as shown below:

This certificate supersedes certificate of correction issued August 24, 2004, the number was erroneously mentioned and should be vacated since certificate of correction should not have issued.

Signed and Sealed this

Twenty-second Day of March, 2005

JON W. DUDAS
*Director of the United States Patent and Trademark Office*